(12) United States Patent
Mehr

(10) Patent No.: US 6,462,732 B2
(45) Date of Patent: Oct. 8, 2002

(54) HAND UN-INHIBITING CURSOR CONTROL DEVICE

(76) Inventor: Michael Mehr, 119 Warren St., Revere, MA (US) 02151

(*) Notice: Subject to any disclaimer, the term of this patent is extended or adjusted under 35 U.S.C. 154(b) by 0 days.

(21) Appl. No.: 09/899,306

(22) Filed: Jul. 5, 2001

(65) Prior Publication Data

US 2001/0040552 A1 Nov. 15, 2001

Related U.S. Application Data

(63) Continuation-in-part of application No. 09/362,771, filed on Jul. 28, 1999, now abandoned.

(51) Int. Cl.[7] .................................................. G09G 5/00
(52) U.S. Cl. ........................ 345/169; 345/156; 345/157
(58) Field of Search ................................. 345/156, 157, 345/169

(56) References Cited

U.S. PATENT DOCUMENTS

| | | | | |
|---|---|---|---|---|
| 4,905,001 A | * | 2/1990 | Penner | 341/20 |
| 4,988,981 A | * | 1/1991 | Zimmerman et al. | 345/158 |
| 5,481,265 A | * | 1/1996 | Russell | 345/157 |
| 5,563,628 A | * | 10/1996 | Stroop | 345/156 |
| 6,297,808 B1 | * | 10/2001 | Yang | 345/167 |

* cited by examiner

Primary Examiner—Mark Zimmerman
Assistant Examiner—Mackly Monestime
(74) Attorney, Agent, or Firm—Lambert & Associates; Gary E. Lambert; Edward Timmer

(57) ABSTRACT

A cursor control device is provided which allows the user to have almost full use of the fingers of the hand for a wide range of tasks while the thumb is used to operate the cursor control device. The control body housing houses the cursor control means and could be secured anywhere on a hand by utilization of securing means. The cursor control device does not require any planar surfaces such as a table and can be operated in any orientation. In a preferred embodiment, the securing means is accomplished by utilization of securing body housing and the device has a capability to switch between two alternative configurations, the closed and open configurations. In the closed configuration the control body housing is placed on the securing body housing and could be held in a grip while thumb is free to operate the cursor control means. In the open configuration, the securing body housing is worn over the hand while the control body housing is placed in a region between the base of the thumb and the tip of the index finger. The open configuration allows for use of the cursor control means by a thumb while the fingers are free to engage in other tasks such as typing.

13 Claims, 11 Drawing Sheets

US 6,462,732 B2

HAND UN-INHIBITING CURSOR CONTROL DEVICE

This application is a Continuation in Part of application No. 09/362,771, filed on Jul. 28, 1999 now abandoned.

FIELD OF THE INVENTION

The present invention relates to cursor control devices. More particularly, the present invention relates to cursor control device that liberates the hand of a user to engage in almost any task while providing an ability to engage the same hand for control and operation of a cursor control device. Such control and operation is done exclusively by the manipulation of the user's hand, fingers, and thumb independent of a desktop or other planar work surface.

In order to use computers and other devices requiring input data from a user, the user must necessarily have a method of entering the requisite information into the device. Graphical User Interfaces (GUI) allow users to enter information into a computer by simply moving (pointing) the cursor to the desired position on the computer screen and then selecting (clicking) from the provided menu choices. There are numerous input devices designed to facilitate users entering information into computers and devices such as a keyboard, a touch screen, a mouse, a trackball, etc. Of these devices, a computer mouse is the most commonly used input device used in conjunction with computers to control placement and movement of computer's cursor. Manipulation of the mouse on a desktop is translated into movement of the computer cursor on the computer screen by means well known in the art. By virtue of moving the mouse along the desktop the user is able to control the placement of the cursor on the computer screen and then enter data by pointing and clicking on menu selections.

As GUIs have proliferated and gained widespread popularity and use with computer designers, builders, and users, the use of the computer mouse has also grown. Continued growth in the use of the computer mouse and the expansion of devices and applications implementing GUIs has prompted the need for an input device capable of working with a variety of devices in the varied environments. The emergence of interactive television, "smart" appliances, and computerized automobile navigational systems are just a few of the applications implementing GUIs where use of the quintessential cursor control device, the mouse, is ill-suited. A mouse, which is intended, and in fact designed, to be used on a desktop or other flat planar surface is neither desired nor practical for use when watching television, in a car, and in a variety of other activities.

Moreover, operation of a mouse requires a complete engagement of a hand. In other words, a right or a left handed person would not. be able to perform any other tasks with his dominant hand when his dominant hand is operating a mouse. For example, a right-handed pilot of a plane would want to grasp plane's control throttle with his right hand. This pilot would want to use his same right hand to operate a cursor control device. When the only available cursor control device is a mouse or it's equivalent, that pilot has to decide whether he wants to operate the throttle or the mouse since he would not be able to do both at the same time. Additionally, normally, a person cannot simultaneously operate two separate devices each with a different hand and do it well.

This invention results from the realization that a more accommodating and, therefore, better cursor control device is effectuated by making a cursor control device which leaves the hand of a user free to engage in any number of tasks while at the same time enabling the user to operate the cursor control device. In our age of ever increasing use of computers in almost every field of activity such cursor control device will play an ever increasing integral role.

SUMMARY OF THE INVENTION

It is, therefore, an object of this invention to provide a cursor control device that leaves user's hand free to operate almost any type of equipment and do so in a manner that is completely independent of a desktop or other planar surface.

It is a further object of this invention to provide a cursor control device that is completely hand-held and functional notwithstanding the orientation of the cursor control device.

Throughout the specification a reference to a "hand" is meant to include both the palm and the five fingers.

The disclosed invention represents a combination of a control body housing and a securing means. The control body housing could be of almost any configuration. It could be disc shaped and have a small size such as that of a coin. One side of the control body housing (a proximal surface area) is pressed against the surface of a palm or a finger. Of course, it could be pressed against a glove or any other intervening layer as long as the control body housing is secured to the hand. The exposed side of the control body housing (a distal surface area) houses a cursor movement means such as a track ball or a pointer device or any other well known in the art cursor movement means. The control body housing is secured to the hand through utilization of a securing means. The securing means could be a number of devices such as a glove, a ring, a rubber band, and any other means that would allow attachment of the control body housing to a hand. It could even be a type of glue that is safe to use on the skin surface.

The thumb is used to operate the cursor control means. The control body housing could be placed on a side of a palm in the area between the base of a thumb and the tip of the index finger. This arrangement allows almost free range of motion for fingers while the thumb is used to operate the cursor control means. By using the disclosed device, the user can type on a keyboard and operate the cursor control device without taking hands away from the keyboard.

Similarly, the control body housing could be placed on a tip of any of the fingers other than the thumb. The user can then engage in almost any type of grasping motion such as holding a steering wheel, a control throttle, or even a handle of a gun. The user might then have a need to operate a computer or another device requiring utilization of a cursor control device. In this case, all that needs to be done is to move the thumb onto the cursor control means which is located conveniently within the reach of the thumb. Now the pilot can utilize her computer without taking her hand off the throttle in case she needs to engage it at any moment. The SWAT team member can keep his index finger on a trigger of a gun while accessing the room plan of a building on his heads up display. In this case, the control body housing could be located on the tip of the middle finger. The index finger is left free to engage the trigger if a suspect suddenly jumps into the line of fire. A surgeon would not need to take his hand away from the operating table if she needs to use a cursor on a monitor. Thus, the present invention enables a person to have a multitasking capacity to operate two different types of mechanisms with the same hand at the same time.

Moreover, it is sometimes desirable to prevent anyone other than the user to have access to the device interfaced with the cursor control device. For example, a car owner would not want car thieves to have access to her onboard computer. Similarly, armed forces would not want to allow enemy to have access to onboard computers in case a military vehicle is captured. With the cursor control device described here, it is easy and convenient to store the cursor control device attached to the hand or in a bag or a pocket. Thus, a soldier abandoning a damaged vehicle would escape with the cursor control remaining on his person, preventing enemy from having access to onboard computers. A car owner can store the cursor control device on her person, for example as a key chain, thus preventing car thieves from having access to onboard computers. Now there is less incentive to break into the car and gut out its GPS (Global Positioning System) when the GPS is rendered useless without an accompanying cursor control device.

DESCRIPTION OF THE INVENTION

This invention represents a hand-held cursor control device.

Figure 1:
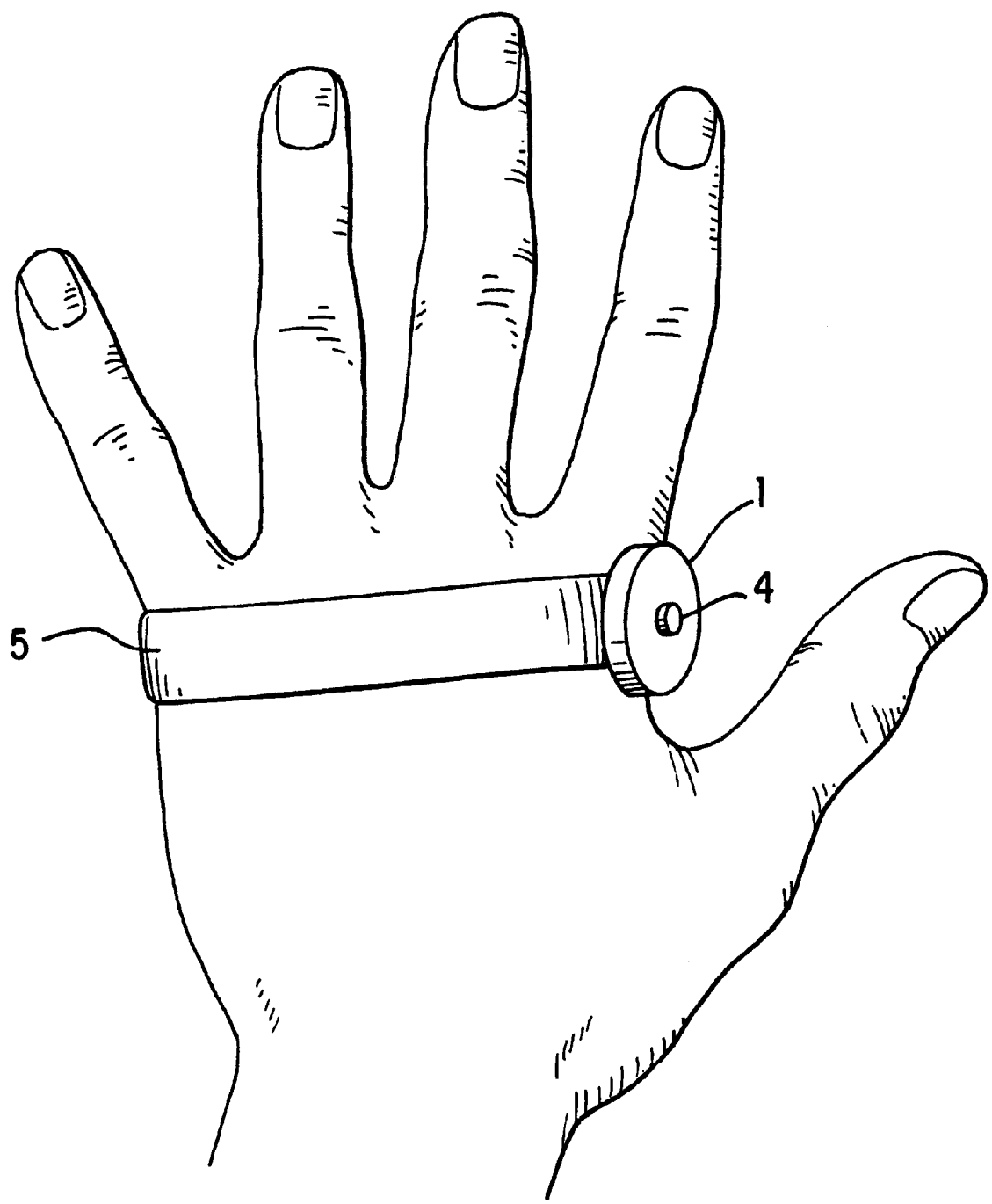
FIG. 1 is a depiction of the control body housing secured on a hand by utilization of securing means.
Figure 2:
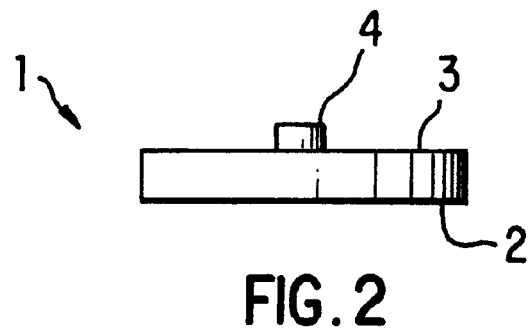
FIG. 2 is a side view of one of the embodiments of the control body housing.
Figure 3:
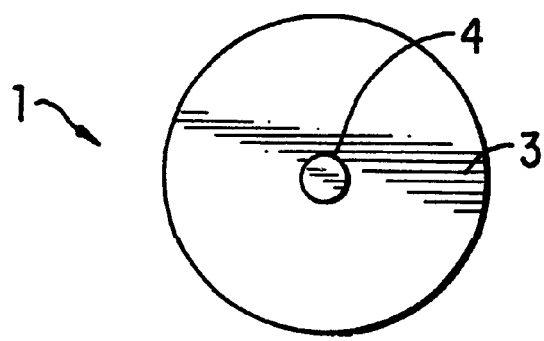
FIG. 3 is a top view of one of the embodiments of the control body housing.
Figure 4:
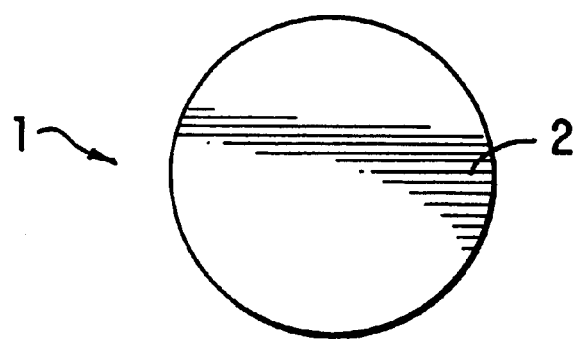
FIG. 4 is a bottom view of one of the embodiments of the control body housing.

The basic components of the claimed hand-held cursor control device are a control body housing 1 and a securing means 5 to secure the control body housing 1 on a hand as depicted in FIG. 2. The control body housing 1 has at least two surface areas, a proximal area 2 and a distal area 3 as depicted in FIGS. 2, 3 and 4. The term "proximal" is used to identify proximal area 2 to denote that this area is closest to the surface of the skin of a hand. The term "distal" is used to identify distal area 3 to denote that this area is located away from the surface of the skin as related to the proximal area 2 and, in effect, the distal area 3 is the front face of the control body housing 1. A cursor movement means 4 is located on the distal area 3 of the control body housing 1 as depicted in FIGS. 1, 2 & 3.

The cursor movement means 4 could be a pointer device, a trackball, or any other well known in the art cursor movement means. The operation of the cursor movement means is done by user's thumb. The signal is then sent to a device interfaced with the hand-held cursor control device. Such signal could be sent by wireless means well know in the art. Alternatively, signal could be sent by using communication means, such as a cable, connecting the hand-held cursor control device with a computer or another type of device.

Figure 5:
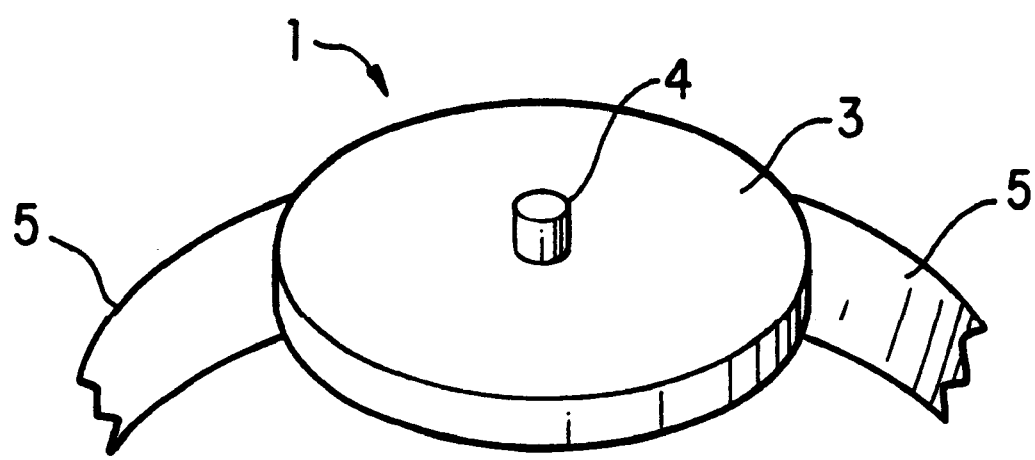
FIG. 5. is a perspective view of one of the embodiments of the invention displaying attachment of securing means to the control body housing.

The securing means 5 could be any number of methods of securing the control body housing 1 on a hand such as a rubber band (See FIGS. 1 and 5), a glove, a ring, a clip, or even a glue. These examples are not meant to be exhaustive of the possibilities since just about any way of securing the control body housing 1 on a hand would do the job.

In one of the embodiments, the control body housing 1 is secured on a hand region which is between the base of a thumb and the tip of the index finger as depicted in FIG. 1. This embodiment is useful when there is a need for a simultaneous use of fingertips and a mouse-like device. One example of such activity is typing on a keyboard. The typist often needs to engage a mouse. By utilizing this invention, there is no need to move hands away from the keyboard thus speeding up the typing process and reducing amount of work related stress on a hand.

Figure 6:
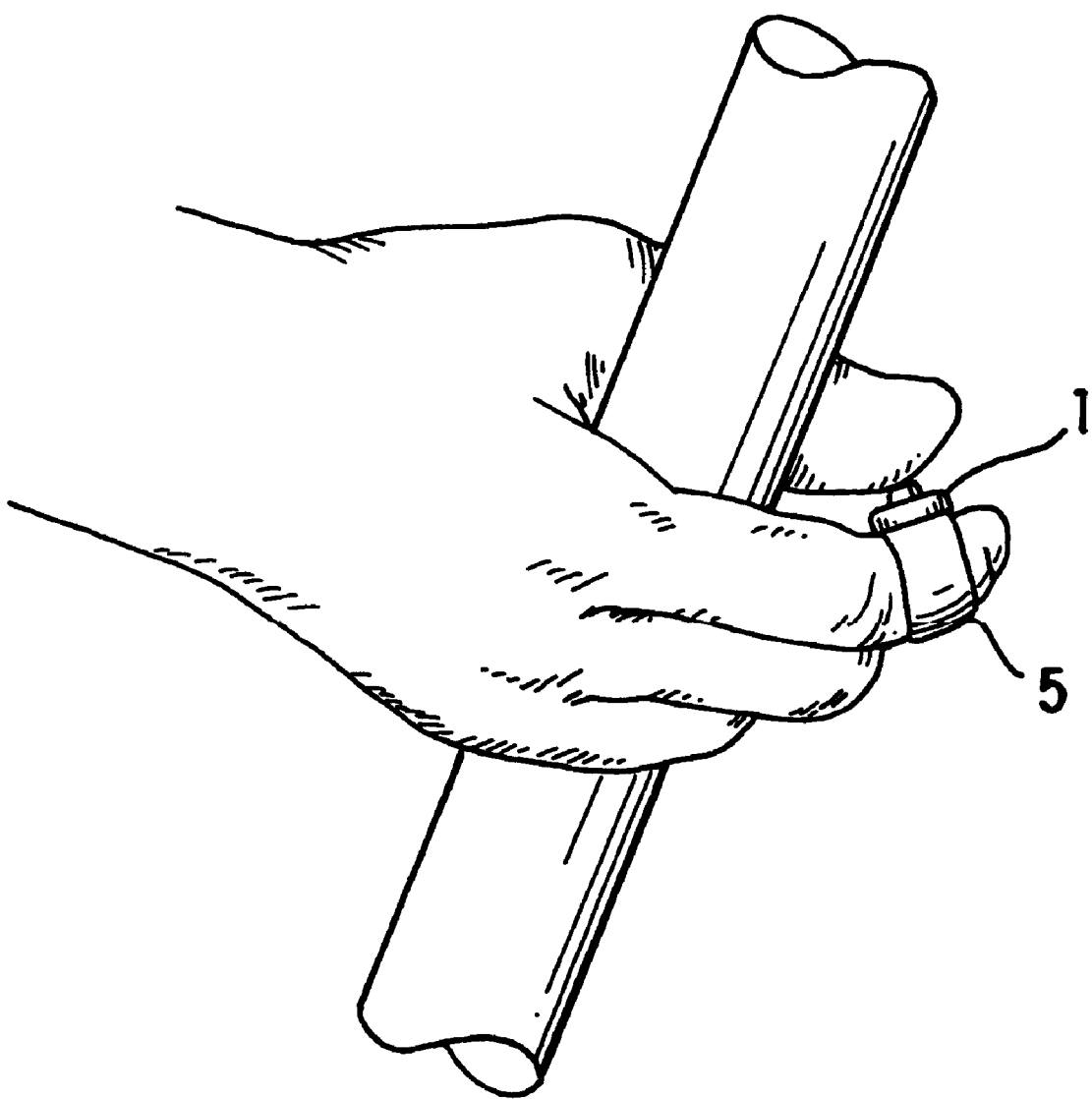
FIG. 6 is a depiction of an embodiment wherein the control body housing is secured on a fingertip by utilization of securing means leaving the user's hand free to grasp an object.

In another embodiment of invention, the control body housing 1 is secured on a fingertip as depicted in FIG. 6. This does not have to be a different embodiment if the securing means 5 is capable of attaching the control body housing 1 on any part of a hand as would be a case if it was a rubber band or a clip. This configuration allows the user to grasp at an object while retaining ability to utilize a "mouse" by placing a thumb on the cursor movement means 4 as shown in FIG. 6.

DESCRIPTION OF THE PREFERRED EMBODIMENTS

In preferred embodiment, called dual configuration embodiment, the disclosed device is made up of two main components, the control body housing 1 and a securing body housing 8 as depicted in FIGS. 7–13. The control body housing 1 has a proximal area 2 and a distal area 3, as well as an upper end 6 and a lower end 7 as depicted in FIGS. 7–9, 13. The cursor movement means 4 is located on the distal area 3 of the control body housing 1 as depicted in FIGS. 7–13.

Figure 7:
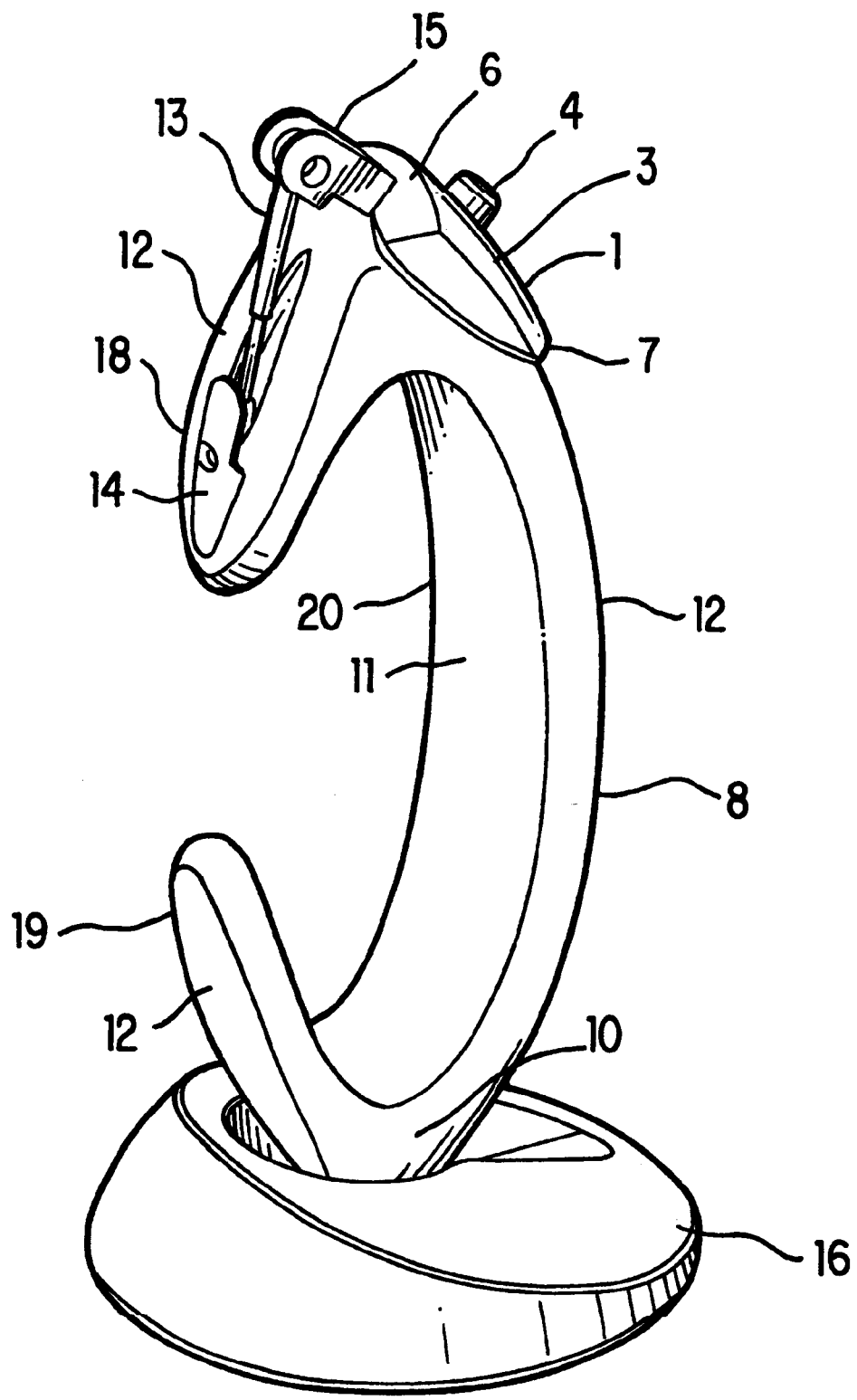
FIG. 7 is a perspective view of the dual configuration embodiment of the invention having a closed configuration and secured on a base unit.
Figure 8:
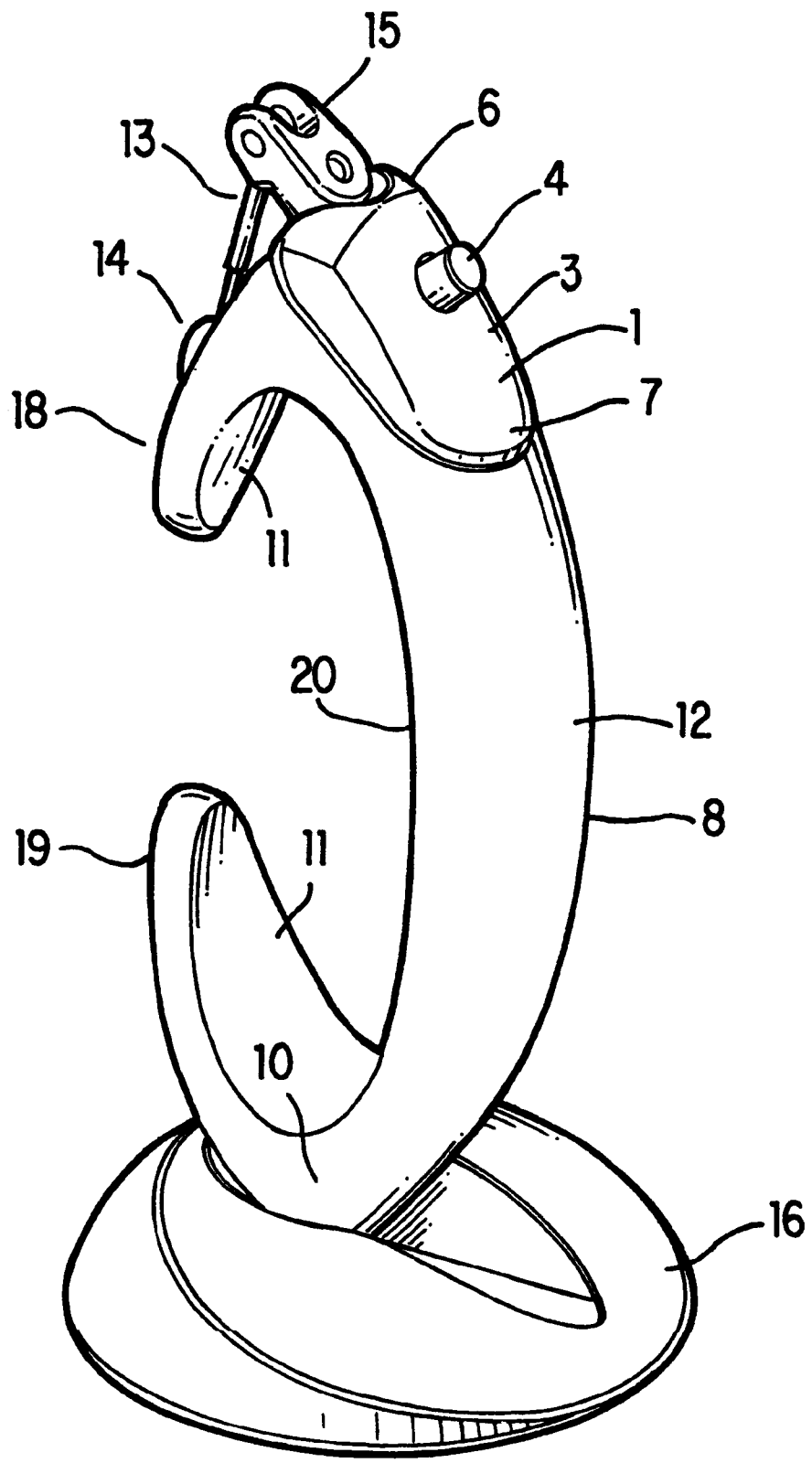
FIG. 8 is a perspective view of the dual configuration embodiment of the invention having a closed configuration and secured on a base unit.
Figure 9:
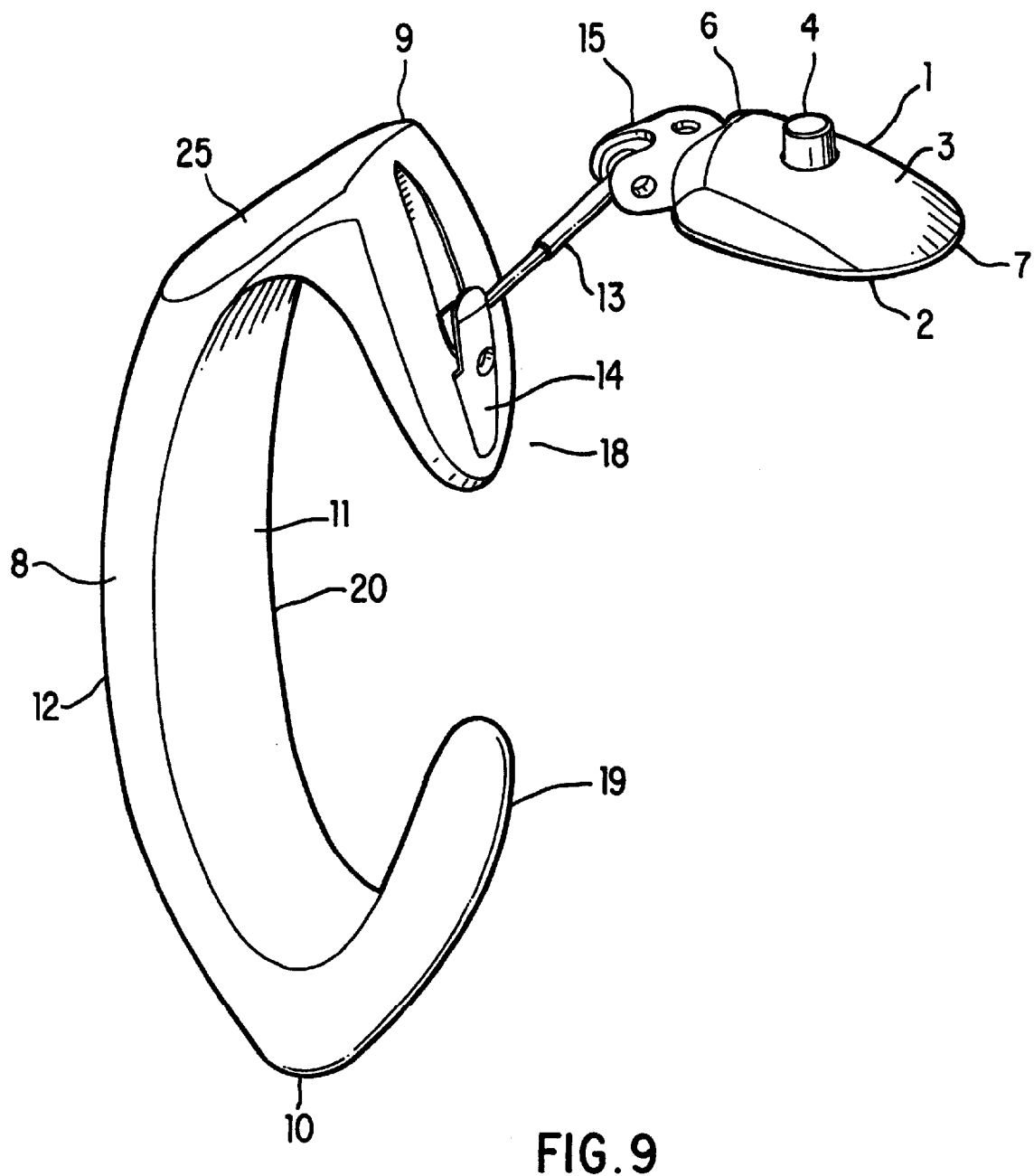
FIG. 9 is a perspective view of the dual configuration embodiment of the invention having an open configuration.

The securing means 5 is accomplished by a securing body housing 8, which has an intermediate portion 20, an upper end 9, and a lower end 10 as depicted in FIG. 9. An upper extension 18 extends from the upper end 9 and a lower extension 19 extends from the lower end 10 as depicted in FIG. 9. The securing body housing 8 has the following surface areas: a proximal area 11, a distal area 12, and a receiving area 25 as depicted in FIGS. 7–9, 13. The distal area 12 extends across the lower extension 19, intermediate portion 20, and upper extension 18 as depicted in FIGS. 7–9. The proximal area 11 also extends across the lower extension 19, intermediate portion 20, and upper extension 18 as depicted in FIGS. 7–9.

Figure 13:
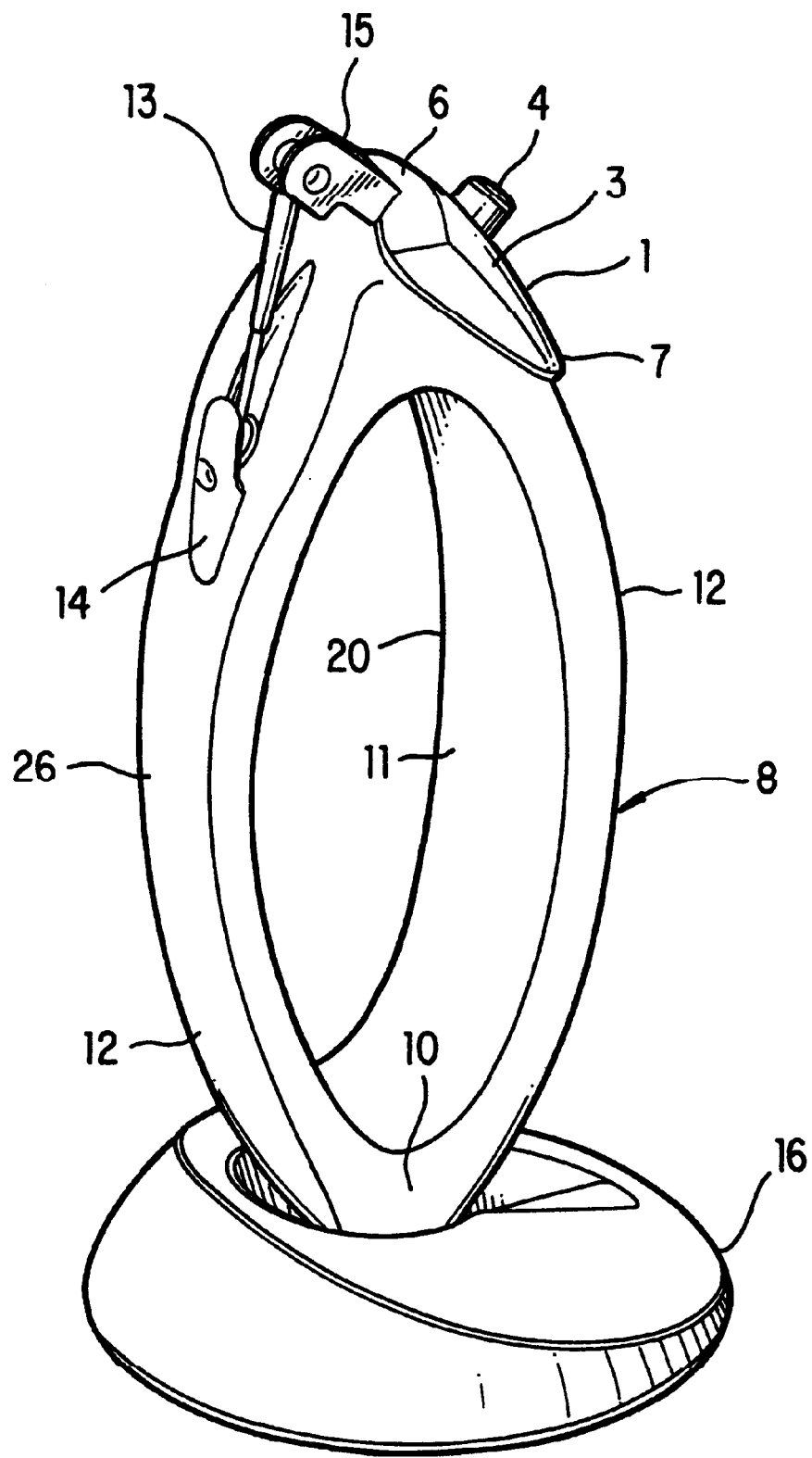
FIG. 13 is a perspective view of the dual configuration embodiment having an optional bridging extension.

In an optional embodiment, of the upper extension 18 and the lower extension 19 are joined to form a single bridging extension 26 as depicted in FIG. 13. Here, the distal area 12 extends across the intermediate portion 20 and the bridging extension 26 as depicted in FIG. 13, while the proximal area 11 also extends across the intermediate portion 20 and the bridging extension 26 as depicted in FIG. 13.

The control body housing 1 is connected to the securing body housing 8 via connecting means 13 as depicted in FIGS. 7–13. The connecting means 13 has a first end 14 and a second end 15 as depicted in FIGS. 7–9, 13. The first end 14 is attached to distal area 12 of the upper extension 18 of the securing body housing 8 as depicted in FIGS. 7–9. The second end 15 is attached to the upper end 6 of the control body housing 1 as depicted in FIGS. 7–9, 13. In an optional embodiment, depicted in FIG. 13, where the bridging extension 26 replaces the upper extension 18 and the lower extension 19, the first end 14 of the connecting means 13 is attached to the bridging extension 26.

The connecting means 13 could be embodied in a number of various ways in which the control body housing 1 and securing body housing 8 are secured to each other such as a cable, a chain, or a series of pivotable variable length joints as the ones depicted in FIGS. 7–9,13.

The lower end 10 of the securing body housing 8 could be placed onto a base unit 16 as depicted in FIGS. 7–9, 13.

This dual configuration embodiment, as its name suggests, is capable of having two different configurations, a closed configuration and an open configuration. In a closed configuration, the control body housing 1 sits atop of the securing body housing 8 as depicted in FIGS. 7, 8, 10, and 13. The proximal area 2 of the control body housing 1 is positioned directly against the receiving area 25 (see FIG. 9) of the securing body housing 8 as depicted in FIGS. 7, 8, 10, 13. The locking means such as VELCRO, a hook clip or any other type of mechanical lacking means could be used to securely hold the control body housing 1 against the receiving area 25 of the securing body housing 8.

Figure 11:
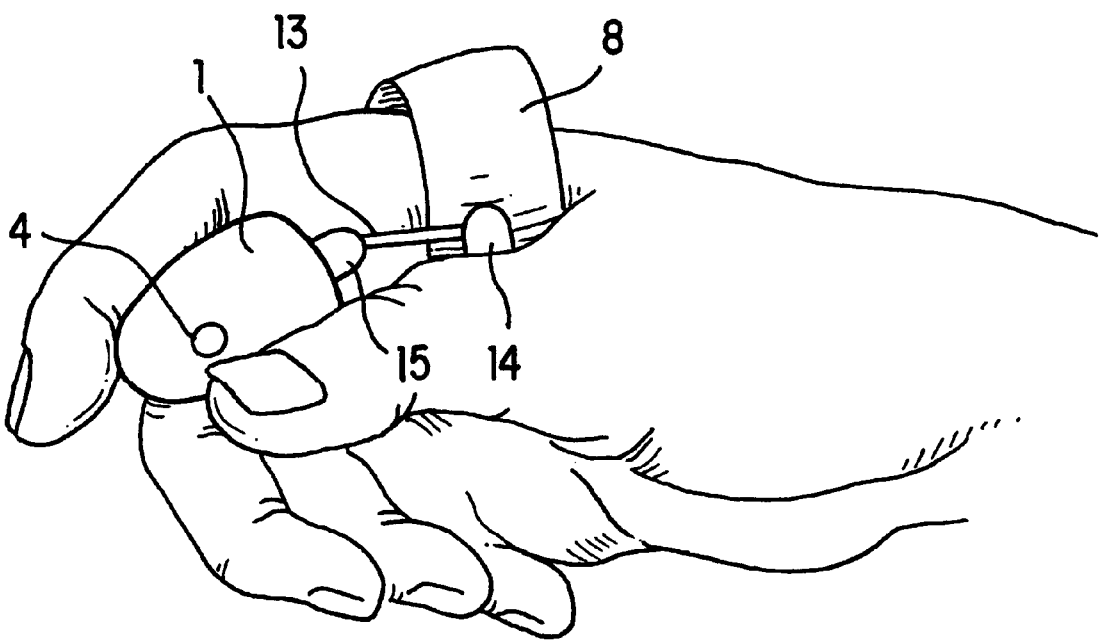
FIG. 11 is a side view of the dual configuration embodiment of the invention having an open configuration and being held in a hand.
Figure 12:
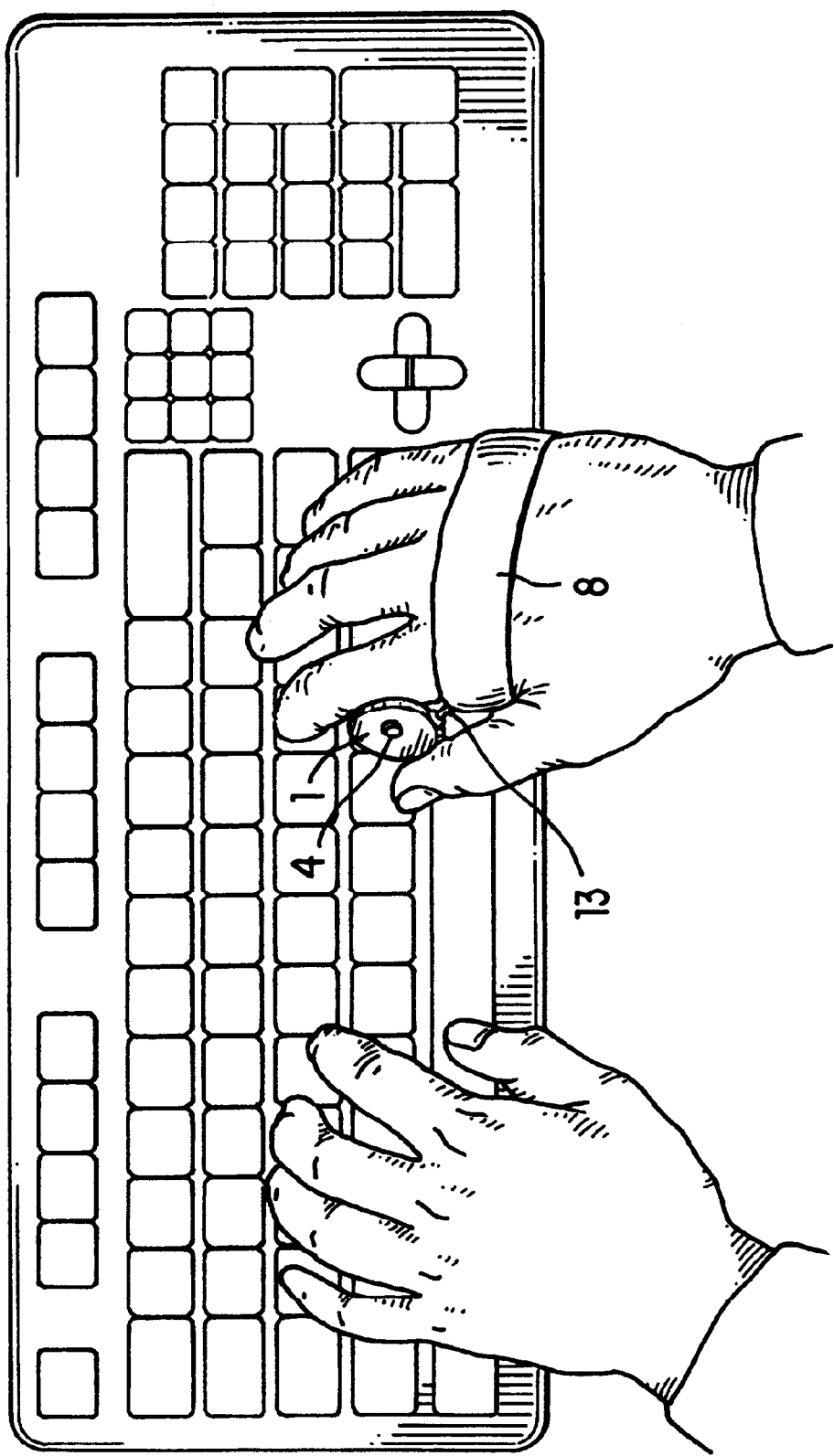
FIG. 12 is a top view of the dual configuration embodiment of the invention having an open configuration and being held in a hand, leaving user's fingers free to utilize a keyboard.

An open configuration is simply a configuration in which the control body housing 1 is not secured to the receiving area 25 of the securing body housing 8 as depicted in FIGS. 9, 11, and 12.

Figure 10:
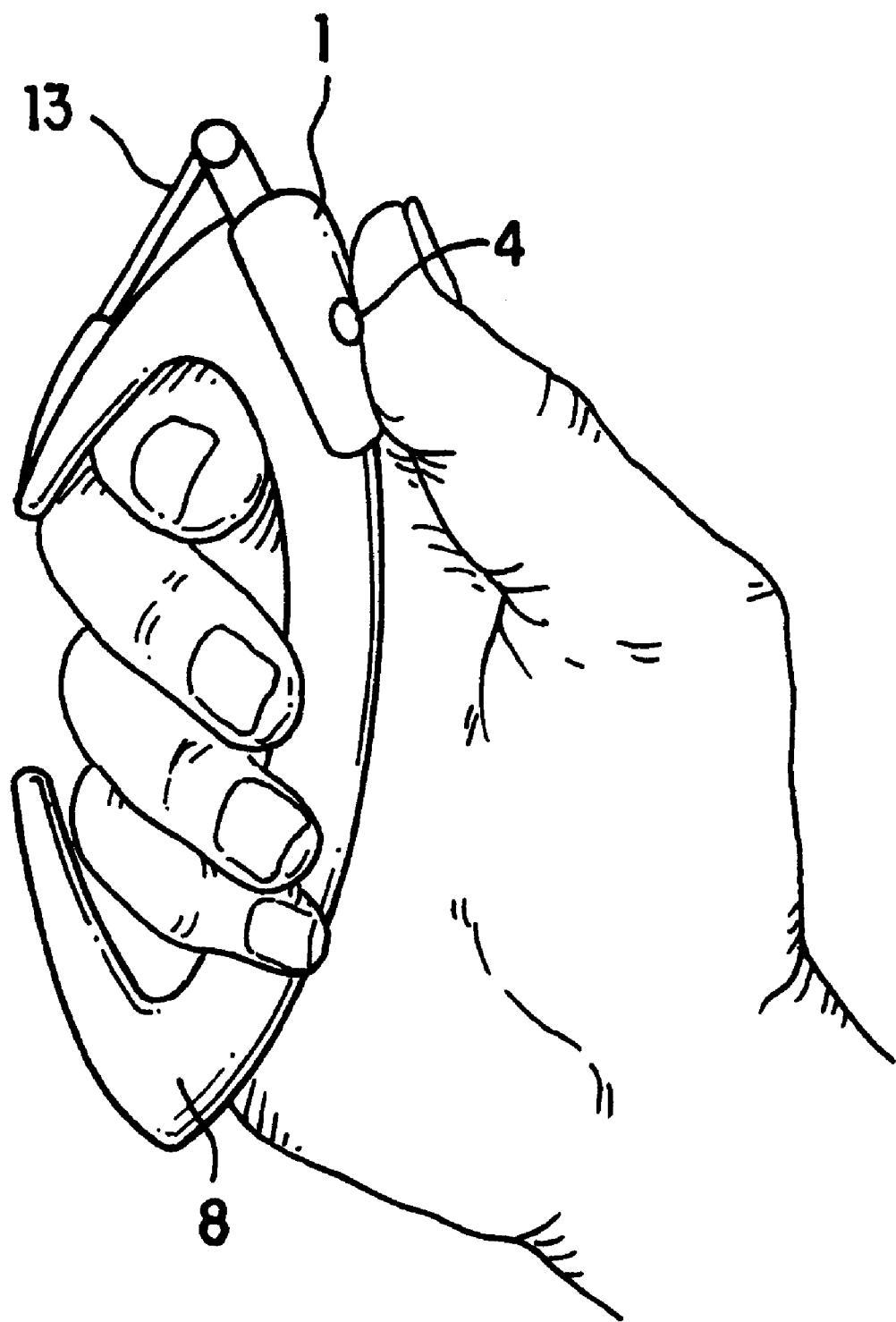
FIG. 10 is a side view of the dual configuration embodiment of the invention having a closed configuration and being held in a hand.

The advantage of the dual configuration embodiment is its ability to function as a cursor control device in both the closed and the open configurations. In a closed configuration, the securing body housing 8 is held in a hand by the intermediate portion 20 as depicted in FIG. 10. Now the user can place the thumb onto the cursor movement means 4 located on the control body housing 1 as depicted in FIG. 10. This mode of use does not free up the hand of the user to do other simultaneous tasks but it provides for a comfortable cursor control means which does not require a planar surface like a table. The closed configuration could be utilized when there is no need to do multitasking with the same hand.

In an open configuration, the securing body housing 8 is worn over the hand while the control body housing 1 is positioned against the side of the index finger as depicted in FIGS. 11 and 12. The user can now place the thumb onto the cursor control means 4 and thus operate the cursor control device. This open configuration does free up the hand of the user to multitasking. The user can type on a keyboard and use the cursor control device without having to move the hand away from the keyboard as depicted in FIG. 12. When a first task to be performed by the hand wearing the dual configuration embodiment is a relatively simple one, such as holding on to a steering wheel, there as an ability for true multitasking since the user can use the thumb to operate the cursor control device while never letting go of the grip of the steering wheel.

The user can easily switch between the closed and open configurations by moving the control body housing 1 onto or away from the receiving area 25 of the securing body housing 8. This ability is advantageous since now the user can choose which configuration is best suited for the task at hand.

What I claim is:

1. A hand-held cursor control device comprising:
  a control body housing having an upper end and a lower end, as well as at least two surface areas, a proximal area and a distal area;
  a securing body housing having an upper end, an intermediate portion, and a lower end, wherein the upper end has an upper extension and the lower end has a lower extension, as well as surface areas, a proximal area and a distal area which areas extend over the intermediate portion, the upper extension, and the lower extension, and a receiving area;
  at least one connecting means having a first end and a second end, wherein the first end is coupled to the upper extension of the securing body housing and the second end is coupled to the upper end of the control body housing;
  at least one cursor movement means located on the distal area of the control body housing, wherein the cursor movement means provides a signal responsive to manipulation of the cursor movement means by thumb or finger.

2. The hand-held cursor control device of claim 1 wherein:
  the cursor movement means is capable of wireless transmission of signals from the hand-held cursor control device to a device interfaced with the hand-held control device.

3. The hand-held cursor control device of claim 1 further comprising:
  a communication means coupled to the lower end of the securing body housing for transmission of the signal provided by the cursor movement means to a device interfaced with the hand-held control device.

4. The hand-held cursor control device of claim 1 wherein:
  the intermediate portion of the securing body housing has a shape that allows for comfortable grip of the securing body housing.

5. The hand-held cursor control device of claim 1 wherein:
  the securing body housing has a shape that allows for comfortable and secure positioning of the securing body housing across the hand, wherein the proximal area of the intermediate portion of the securing body housing is positioned over the back-side of the hand and the upper and lower extensions of the securing body housing extend under the under-side of the hand.

6. The hand-held cursor control device of claim 1 wherein:
  the hand-held cursor control device is capable of having a closed configuration wherein the proximal area of the control body housing is positioned directly against the receiving area of the securing body housing.

7. The hand-held cursor control device of claim 1 wherein:

the hand-held cursor control device is capable of having an open configuration wherein the control body housing is positioned apart from the securing body housing and the proximal area of the control body housing is positioned against the side of a hand located between the base of the thumb and the tip of the index finger.

8. The hand-held cursor control device of claim 1 wherein:

the proximal area of the control body housing device has a surface shape which is complimentary to the corresponding surface shape of the receiving area of the securing body housing.

9. The hand-held cursor control device of claim 1 further comprising:

the locking means for securing of the control body housing onto the receiving area of the securing body housing.

10. The hand-held cursor control device of claim 1 wherein:

the control body housing has a shape that allows for a comfortable positioning of the proximal area of the control body housing against the side of a hand located between the base of the thumb and the tip of the index finger.

11. The hand-held cursor control device of claim 1 wherein:

the receiving area of the securing body housing is located in proximity of the upper end of the securing body housing.

12. The hand-held cursor control device of claim 1 wherein:

the upper extension of the securing body housing and the lower extension of the securing body housing are joined to form a single bridging extension wherein the hand can be placed between the intermediate portion of the securing body housing and the bridging extension and wherein the first end of the connecting means is affixed to the bridging extension.

13. The hand-held cursor control device of claim 1 further comprising:

a base unit, wherein the base unit is capable of receiving the lower end of the securing body housing and capable of securely holding in place the securing body housing.

* * * * *